US012238832B2

(12) United States Patent
Zhang et al.

(10) Patent No.: US 12,238,832 B2
(45) Date of Patent: Feb. 25, 2025

(54) LIGHTING APPARATUS

(71) Applicant: LEEDARSON LIGHTING CO.,LTD., Fujian (CN)

(72) Inventors: Jiayuan Zhang, Fujian (CN); Changjing Zeng, Fujian (CN); Jingjing Su, Fujian (CN); Xiaoming Yang, Fujian (CN); Zongyuan Liu, Fujian (CN); Liangliang Cao, Fujian (CN)

(73) Assignee: LEEDARSON LIGHTING CO.,LTD., Fujian (CN)

( * ) Notice: Subject to any disclaimer, the term of this patent is extended or adjusted under 35 U.S.C. 154(b) by 0 days.

(21) Appl. No.: 18/413,528

(22) Filed: Jan. 16, 2024

(65) Prior Publication Data

US 2024/0155748 A1 May 9, 2024

Related U.S. Application Data

(63) Continuation of application No. 17/862,361, filed on Jul. 11, 2022, now Pat. No. 11,910,500.

(30) Foreign Application Priority Data

Jul. 9, 2021 (CN) ........................ 202110777856.X

(51) Int. Cl.
*H05B 45/20* (2020.01)
*H05B 45/46* (2020.01)

(52) U.S. Cl.
CPC ............. *H05B 45/20* (2020.01); *H05B 45/46* (2020.01)

(58) Field of Classification Search
CPC ........ H05B 45/10; H05B 45/20; H05B 45/30; H05B 45/46; H05B 47/10
See application file for complete search history.

(56) References Cited

U.S. PATENT DOCUMENTS

2007/0223219 A1* 9/2007 Medendorp ........ C09K 11/7702 257/E33.001
2015/0377699 A1* 12/2015 Ho ......................... H05B 47/22 250/206

* cited by examiner

*Primary Examiner* — Jimmy T Vu
(74) *Attorney, Agent, or Firm* — Chun-Ming Shih; LANWAY IPR SERVICES

(57) ABSTRACT

A lighting apparatus includes a first light source, a second light source and a driver. The first light source has multiple first LED modules. The second light source has multiple second LED modules. The driver controls the first light source and the second light source to generate an output light of a required mixed color temperature. The driver selects a first subset of the multiple first LED modules and a second subset of the multiple second LED modules to generate a first output light with a first color temperature. The driver selects a third subset of the multiple first LED modules and a fourth subset of the multiple second LED modules to generate a second output light with a second color temperature. The first subset is not equal to the third subset. The second subset is not equal to the fourth subset.

20 Claims, 15 Drawing Sheets

LIGHTING APPARATUS

RELATED APPLICATION

The present application is a continued application of U.S. patent application Ser. No. 17/862,361.

FIELD

The present invention is related to a lighting apparatus, and more particularly related to a lighting apparatus with a flexible control on color temperature.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

People looks for light devices to generate lights more like environment light. To achieve such goal, complicated designs are added to light devices.

However, it is important and helpful to achieve such goal in a cost effective solution while keeping accuracy of the mixed color temperature. People looks for light devices to generate lights more like environment light. To achieve such goal, complicated designs are added to light devices.

However, it is important and helpful to achieve such goal in a cost effective solution while keeping accuracy of the mixed color temperature.

SUMMARY

In some embodiments, a lighting apparatus includes a first light source, a second light source and a driver.

The first light source has multiple first LED modules.

The second light source has multiple second LED modules.

The driver controls the first light source and the second light source to generate an output light of a required mixed color temperature.

The driver selects a first subset of the multiple first LED modules and a second subset of the multiple second LED modules to generate a first output light with a first color temperature.

The driver selects a third subset of the multiple first LED modules and a fourth subset of the multiple second LED modules to generate a second output light with a second color temperature.

The first subset is not equal to the third subset.

The second subset is not equal to the fourth subset.

In some embodiments, a portion of the multiple first LED modules and a portion of multiple second LED modules are not turned on for generating a third output light with a third color temperature.

In some embodiments, the driver determines a first activation number of the first LED modules and a second activation number of the second LED modules to mix a target color temperature.

In some embodiments, the first activation number and the second activation number are determined according a mixing formula approaching to a blackbody chromaticity diagram.

In some embodiments, a color tolerance adjustment of a mixed color temperature is less than 7 steps.

In some embodiments, a color tolerance adjustment of a mixed color temperature is less than 5 steps.

In some embodiments, the first LED module includes multiple first LED chips connected in series as multiple first LED strings.

The second LED module includes multiple second LED chips connected in series as multiple second LED strings.

In some embodiments, the first subset of the multiple first LED modules corresponds to a number of first LED strings.

The second subset of the multiple second LED modules corresponds to a number of second LED strings.

In some embodiments, the first LED series and the second LED series include same number of LED chips.

In some embodiments, the driver includes a manual switch for a user to select from multiple options.

A first option corresponds to the first subset and the second subset.

A second option corresponds to the third subset and the fourth subset.

In some embodiments, manual switch is a mechanical switch for a user to operate.

In some embodiments, when the first option is selected, the first subset of multiple first LED modules are activated and other first LED modules of the first light source is not activated.

In some embodiments, the lighting apparatus may also include a third light source including multiple third LED modules.

The driver selects a variation number of the multiple third LED modules together with the first light source and the second light source to generate a target color temperature.

In some embodiments, the first light source has a color temperature between 2700K and 7000K.

The second light source has a color temperature between 1800K and 5500K.

A target color temperature mixed by the first light source and the second light source is between 2580K and 6020K.

In some embodiments, a first input voltage is supplied to the multiple first LED modules.

A second input voltage is supplied to the multiple second LED modules.

A difference between the first input voltage and the second input voltage is less than 10%.

In some embodiments, the multiple first LED modules and the multiple second LED modules are arranged on a circuit board in an alternative order.

In some embodiments, the first light source and the second light source are integrated on a single circuit board to form a light module.

In some embodiments, the first light source and the second light source are arranged with other light sources in a symmetric manner.

In some embodiments, the first light source, the second light source and the driver are integrated on a single circuit board.

In some embodiments, a manual switch is mounted on the single circuit board for a user to select a target color temperature.

DETAILED DESCRIPTION

Figure 15:
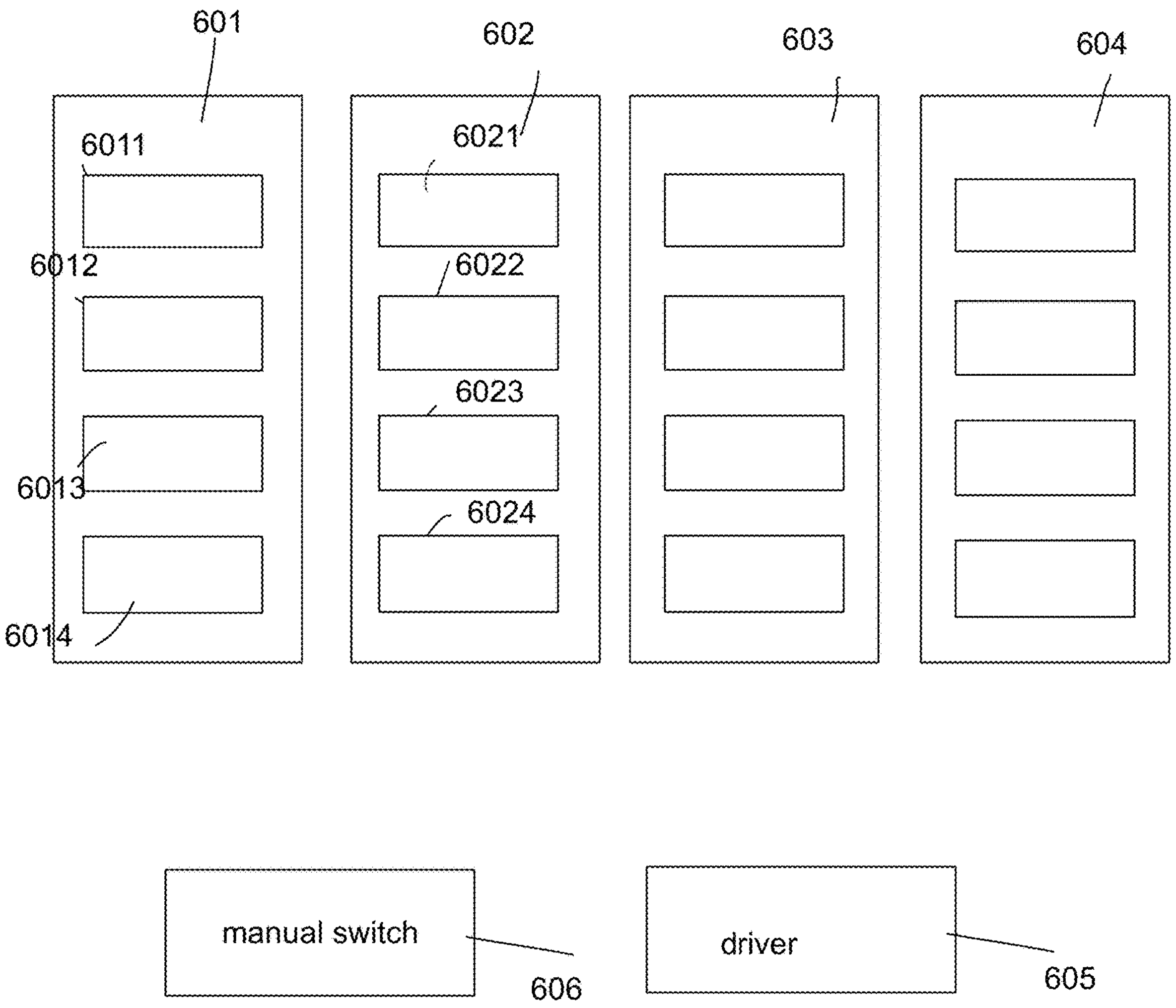
FIG. 15 shows a lighting apparatus example.

In FIG. 15, a lighting apparatus includes a first light source 601, a second light source 602 and a driver 605.

The first light source 601 has multiple first LED modules 6011, 6012, 6013, 6014.

The second light source 602 has multiple second LED modules 6021, 6022, 6023, 6024.

The driver 605 controls the first light source 601 and the second light source 602 to generate an output light of a required mixed color temperature.

For example, the driver 605 includes a rectifier for converting an AC power to a DC power. The driver 605 may include some filters and protection circuit to ensure the safety and stable of driving power output. The LED modules in the first light source 601 and the second light source 602 receive a driving current from the driver 605 when needed to emit light. The driver 605 determines when and how to activate the LED modules in the first light source 601 and the second light source 602 to generate a required light with a desired color temperature.

In some embodiments, the first light source 601 have LED modules with a color temperatures while the second light source 602 have LED modules with another color temperature. The color temperature of the first light source 601 is different from the color temperature of the second light source 602. Therefore, by selectively controlling the relative light intensity of the first color temperature and the second color temperature, a desired color temperature may be mixed.

In some embodiments, the first light source 601 may contain multiple types of LED modules with multiple types of color temperatures. It is same to the second light source 602.

In addition, there may be a third light source 603, a fourth light source 604 and even more light source not illustrated based on the inventive idea mentioned below.

The driver 605 selects a first subset of the multiple first LED modules and a second subset of the multiple second LED modules to generate a first output light with a first color temperature.

For example, the first subset includes the LED modules 6011, 6012 to be activated while the LED modules 6013, 6014 are kept turned off.

The second subset includes the LED modules 6021 to be activated while the LED modules 6022, 6023, 6024 are kept turned off.

In such case, the LED modules 6011, 6012, 6021 are selected to mix a desired output light.

The driver 605 selects a third subset of the multiple first LED modules and a fourth subset of the multiple second LED modules to generate a second output light with a second color temperature.

For example, the third subset includes the LED modules 6011 while keeping the LED modules 6012, 6013, 6014 turned off.

Meanwhile, the fourth subset includes the LED modules 6021, 6022, 6023 while keeping the LED module 6024 turned off.

In such case, the LED modules 6011, 6021, 6022, 6023 are selected to mix a desired output light.

In other words, for any target output light, the driver 605 selects a set of LED modules among different types of light sources to activate while keeping others turned off to mix a output light. In some case, all LED modules may be selected if necessary.

As shown in the example above, the first subset is not equal to the third subset. The second subset is not equal to the fourth subset.

In some embodiments, a portion of the multiple first LED modules and a portion of multiple second LED modules are not turned on for generating a third output light with a third color temperature.

In some embodiments, the driver determines a first activation number of the first LED modules and a second activation number of the second LED modules to mix a target color temperature.

In some embodiments, the first activation number and the second activation number are determined according a mixing formula approaching to a blackbody chromaticity diagram.

In some embodiments, a color tolerance adjustment of a mixed color temperature is less than 7 steps.

Figure 1:
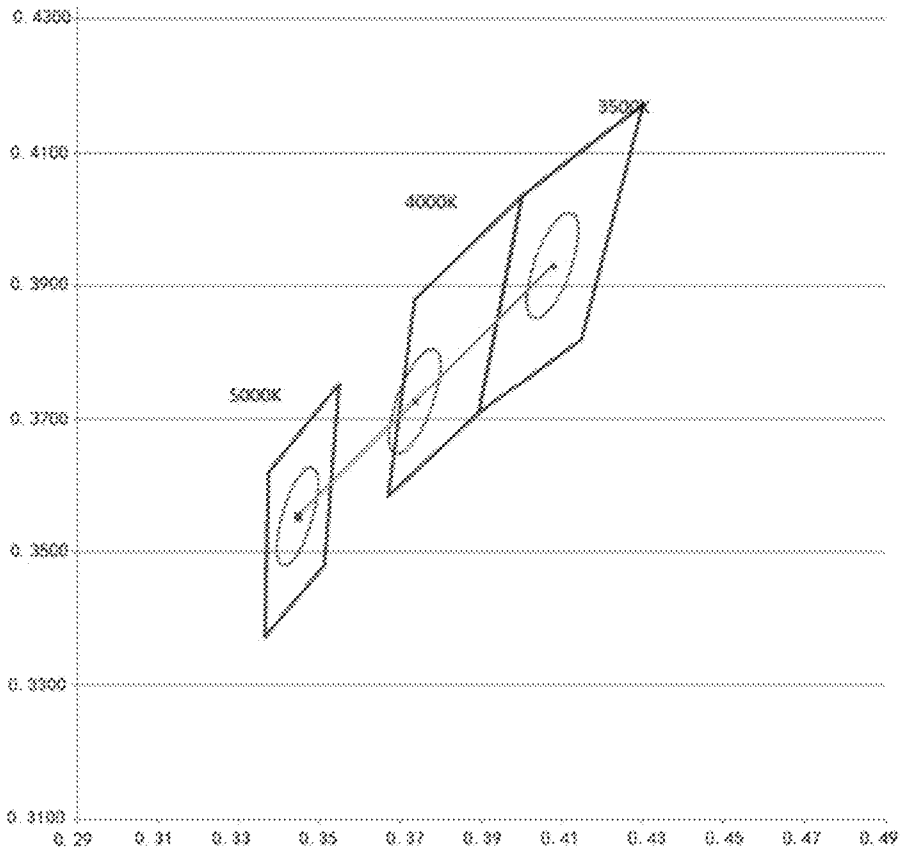
FIG. 1 illustrates a mixed color temperature diagram.

FIG. 1 and other similar drawings show a curve line of a blackbody chromaticity. By mixing multiple types of LED modules to approach the curve line, the driver may calculate or check from a table that stores a calculated result. Such table may also be converted to logic computation circuit disposed in the driver.

In some embodiments, a color tolerance adjustment of a mixed color temperature is less than 5 steps.

Persons of ordinary skilled in the art know the concept of color tolerance adjustment and the blackbody chromaticity and thus details thereof are not repeated for brevity.

In some embodiments, the first LED module includes multiple first LED chips connected in series as multiple first LED strings.

The second LED module includes multiple second LED chips connected in series as multiple second LED strings.

Figure 3:
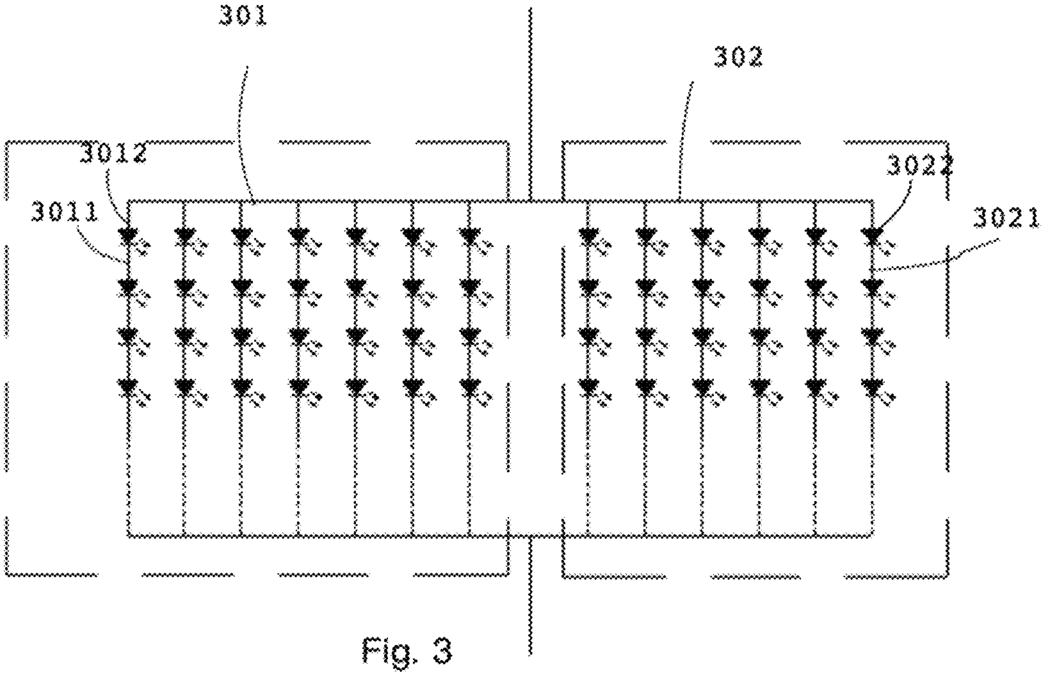
FIG. 3 illustrates an example of disposing multiple types of LED modules.
Figure 4:
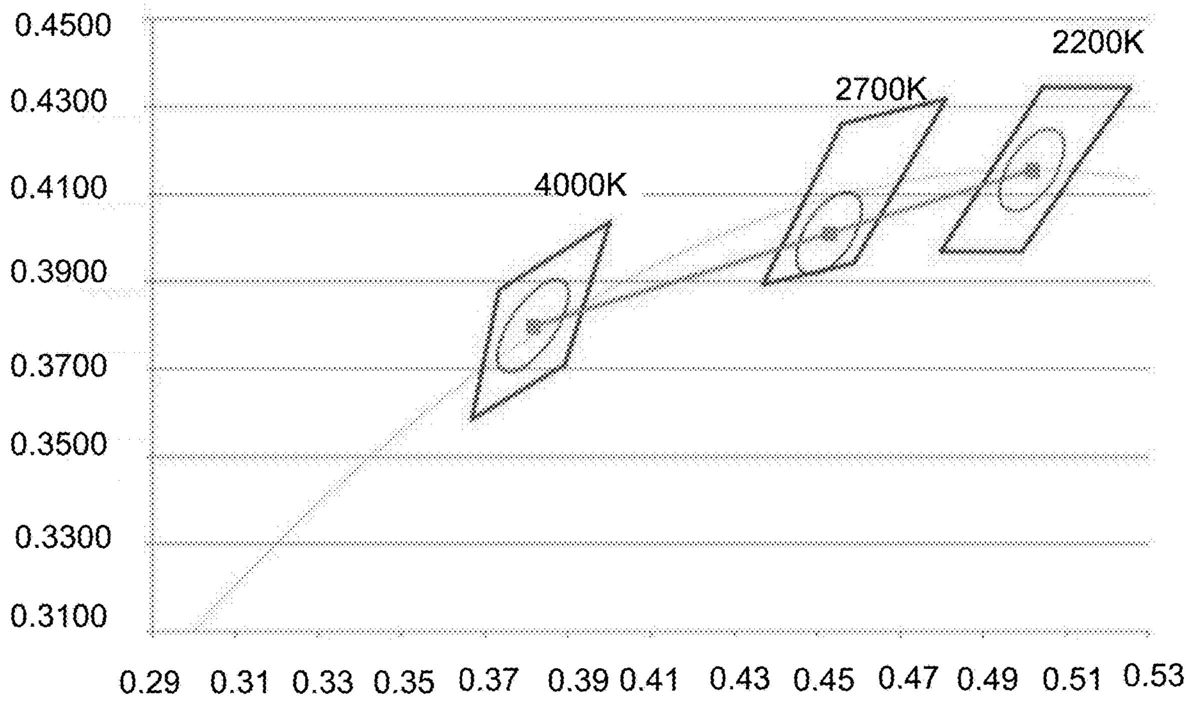
FIG. 4 illustrates another mixed color temperature diagram.

In FIG. 3, the first light source 301 includes multiple first LED strings 3012. Each first LED string 3011 includes multiple first LED chips 3012 connected in series.

In FIG. 3, the second light source 302 includes multiple second LED strings 3021. Each second LED string 3021 includes multiple second LED chips 3022 connected in series.

The second LED chips 3022 and the first LED chips 3012 may emit lights of different color temperatures.

Each LED string may be regarded as a module that the driver may operate separately, e.g. to activate or to disable, to achieve the function mentioned in the examples mentioned above.

In some embodiments, the first subset of the multiple first LED modules corresponds to a number of first LED strings.

The second subset of the multiple second LED modules corresponds to a number of second LED strings.

In other words, the driver does not activate all LED modules at the same time, but select a subset of LED modules to turn on to generate a required mixed light output.

In some embodiments, the first LED series and the second LED series include same number of LED chips.

In FIG. 15, the driver 605 includes a manual switch 606 for a user to select from multiple options. The manual switch 606 may have a portion integrated with the driver 605. In some other embodiments, the manual switch 606 may be a separate component sending a selected message to the driver 605 to indicate the driver to choose a subset of LED modules to activate to generate a required output light.

A first option corresponds to the first subset and the second subset.

A second option corresponds to the third subset and the fourth subset.

There may be more than two options, and each option may correspond to a subset of LED modules for the driver to activate to generate a required color temperature.

In some embodiments, the manual switch is a mechanical switch for a user to operate.

In some embodiments, when the first option is selected, the first subset of multiple first LED modules are activated and other first LED modules of the first light source is not activated.

In some embodiments, the lighting apparatus may also include a third light source including multiple third LED modules.

The driver selects a variation number of the multiple third LED modules together with the first light source and the second light source to generate a target color temperature.

In some embodiments, the first light source has a color temperature between 2700K and 7000K.

The second light source has a color temperature between 1800K and 5500K.

A target color temperature mixed by the first light source and the second light source is between 2580K and 6020K.

In some embodiments, a first input voltage is supplied to the multiple first LED modules.

A second input voltage is supplied to the multiple second LED modules.

A difference between the first input voltage and the second input voltage is less than 10%.

In some embodiments, the multiple first LED modules and the multiple second LED modules are arranged on a circuit board in an alternative order.

Figure 14:
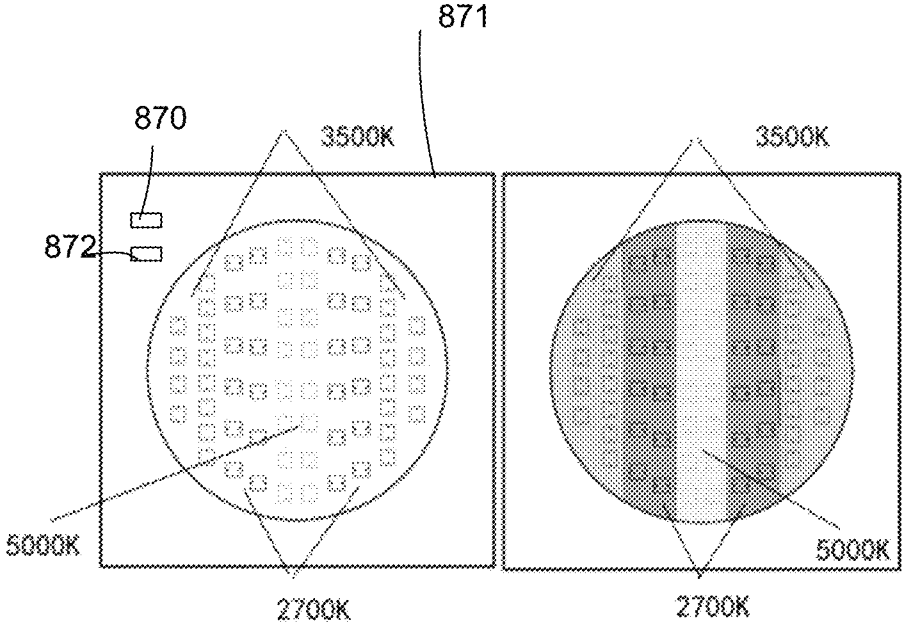
FIG. 14 illustrates another pattern for disposing multiple types of LED modules.

For example, FIG. 14 shows a circuit board mounted with LED modules of 3500K, 2700K and 5000K. They are arranged in an alternative order to render a better mixing light effect.

In some embodiments, the first light source and the second light source are integrated on a single circuit board to form a light module.

In some embodiments, the first light source and the second light source are arranged with other light sources in a symmetric manner.

In FIG. 14, the first light source, the second light source and the driver 870 are integrated on a single circuit board 871.

In some embodiments, a manual switch 872 is mounted on the single circuit board 871 for a user to select a target color temperature.

Please refer to FIG. 1, which illustrates an example of mixing multiple output lights with varying color temperatures. The curve line in FIG. 1 refers to an ideal blackbody radiation chromaticity. The circle shows a first color tolerance adjustment ranges. The rectangular areas show a mixing range with multiple types of LED modules.

Figure 2:
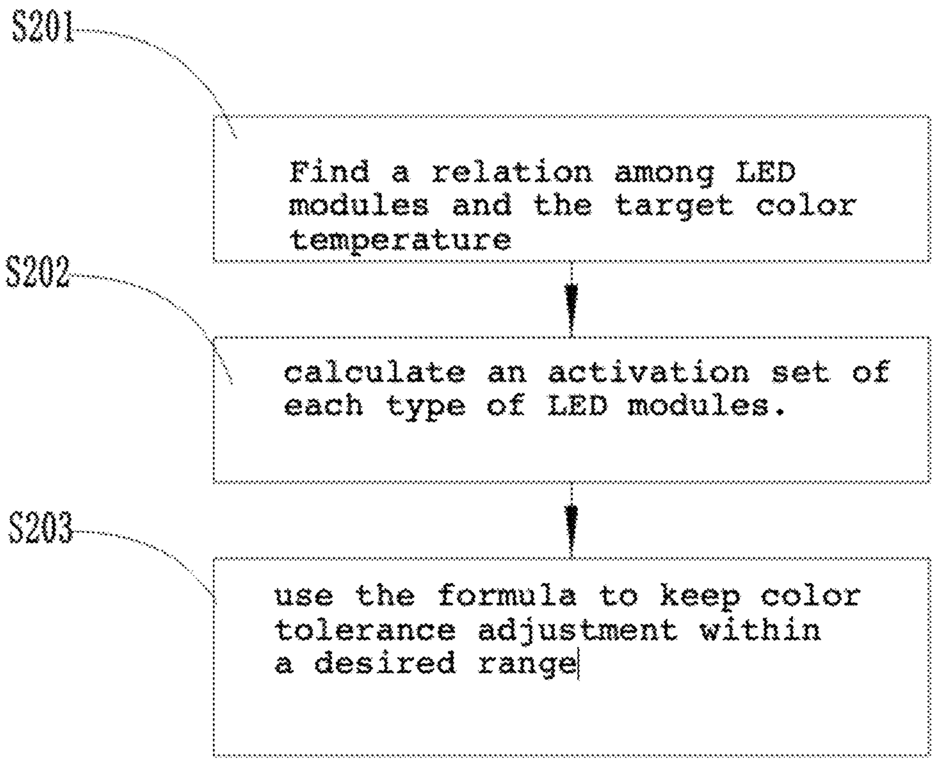
FIG. 2 illustrates a flowchart to perform color temperature mixing.

FIG. 2 shows a flowchart to illustrates a method to use the inventive ideas mentioned above.

In FIG. 2, a relation among different types of LED modules and a target color temperature are obtained (step S201). The activation set of LED modules are selected (step S202). The blackbody chromaticity as illustrated in FIG. 1 is used for finding an optimized combination of the LED modules to activate to approach the ideal light pattern (step S203).

FIG. 4, FIG. 6, FIG. 7, FIG. 8, FIG. 9, FIG. 10, FIG. 11, FIG. 12, FIG. 13 show examples on finding the subset of LED modules to mix desired color temperatures in different scenarios.

Figure 5:
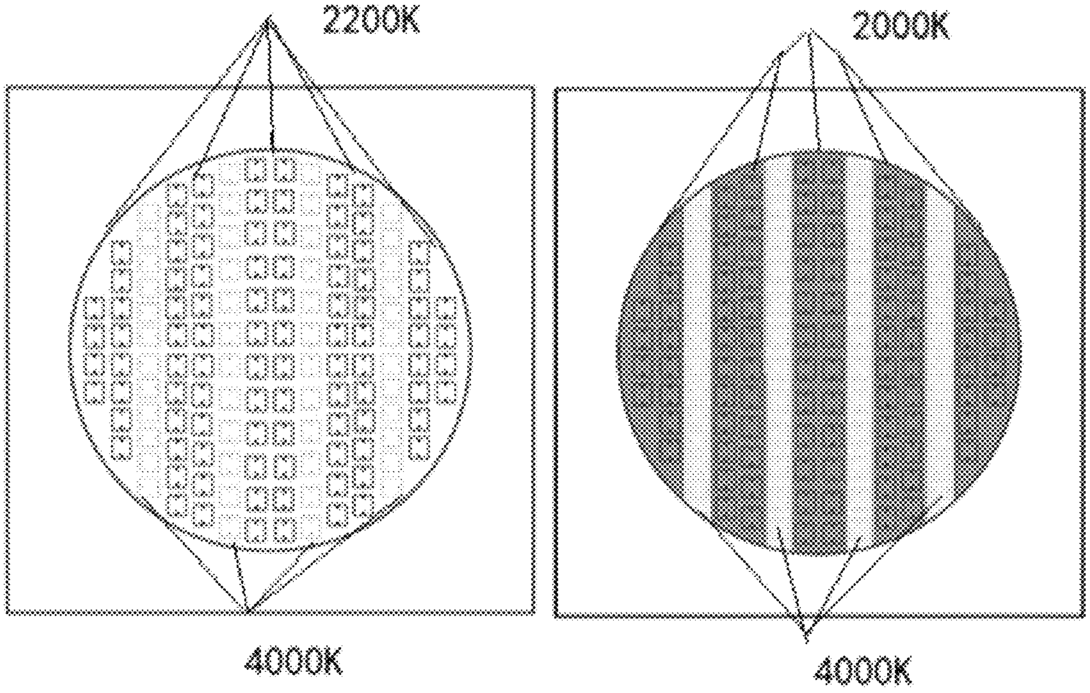
FIG. 5 illustrates a pattern for disposing multiple types of LED modules.
Figure 6:
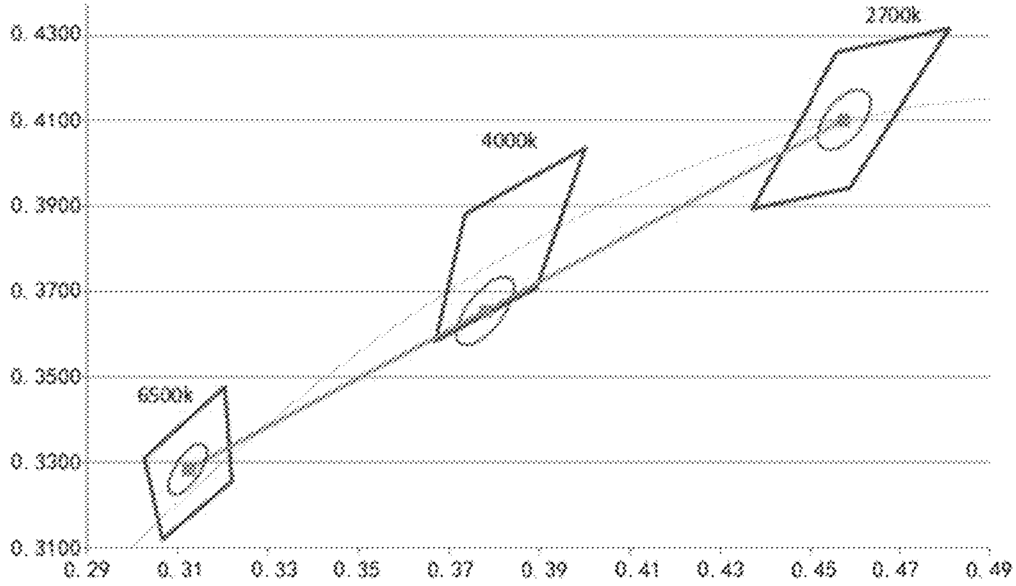
FIG. 6 illustrates another mixed color temperature diagram.
Figure 7:
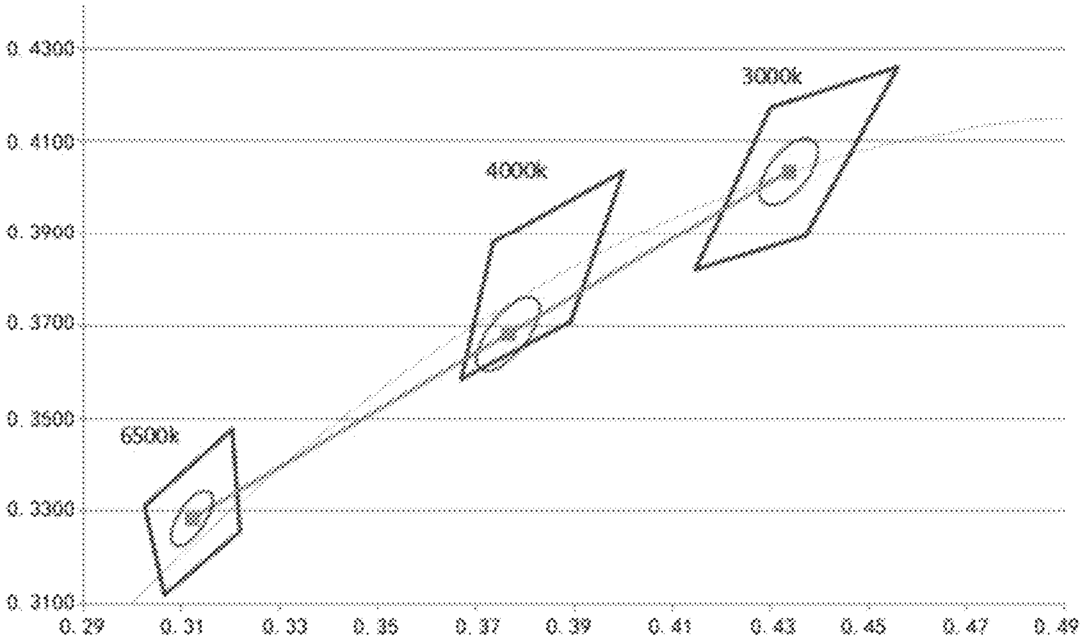
FIG. 7 illustrates another mixed color temperature diagram.
Figure 8:
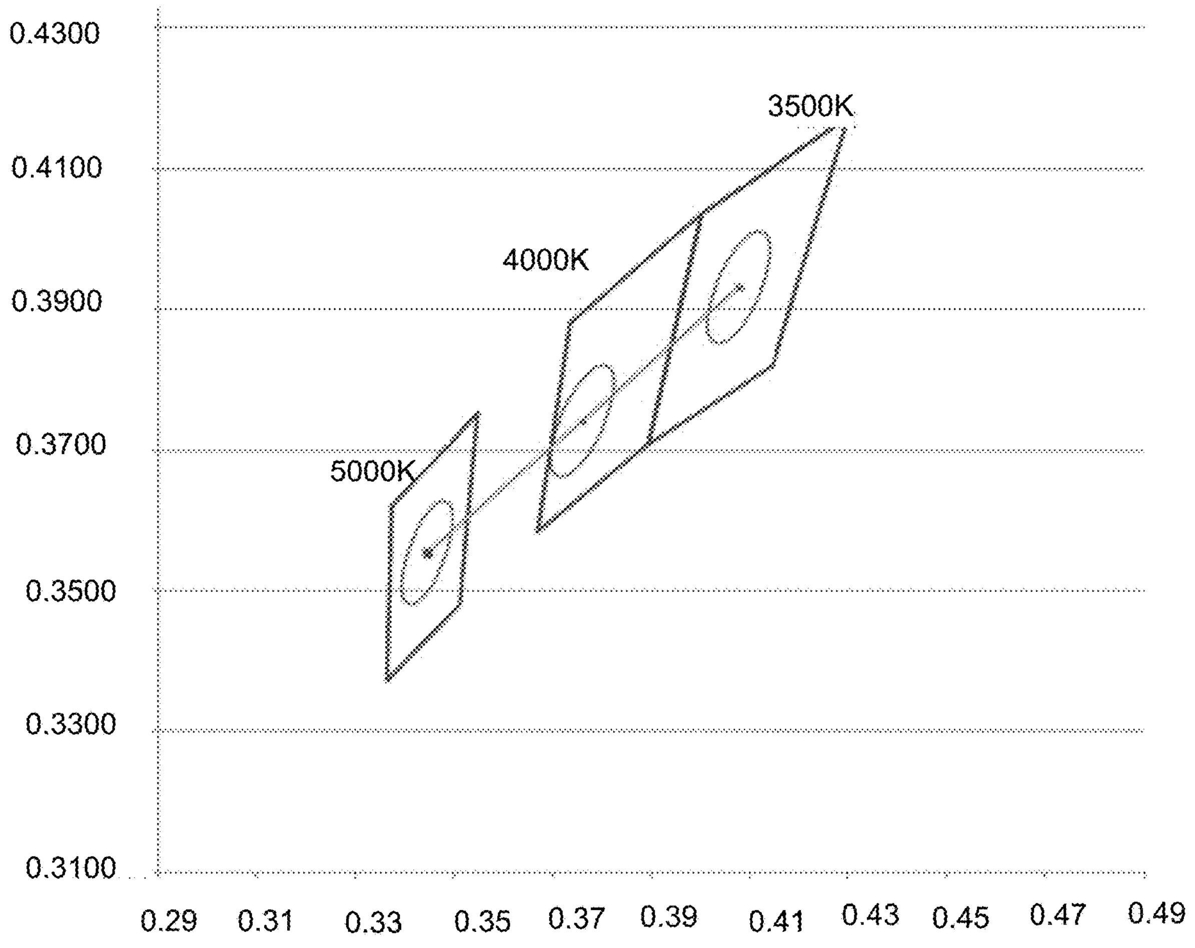
FIG. 8 illustrates another mixed color temperature diagram.
Figure 9:
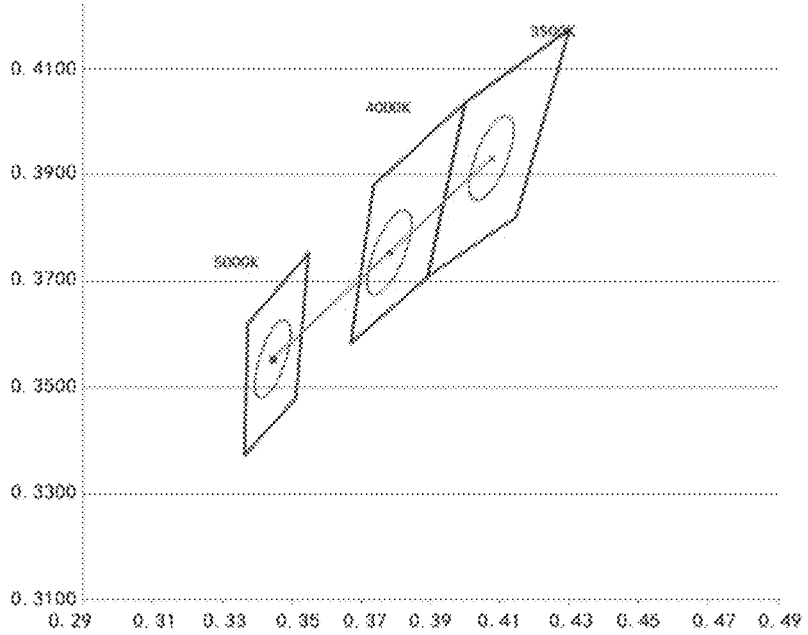
FIG. 9 illustrates another mixed color temperature diagram.
Figure 10:
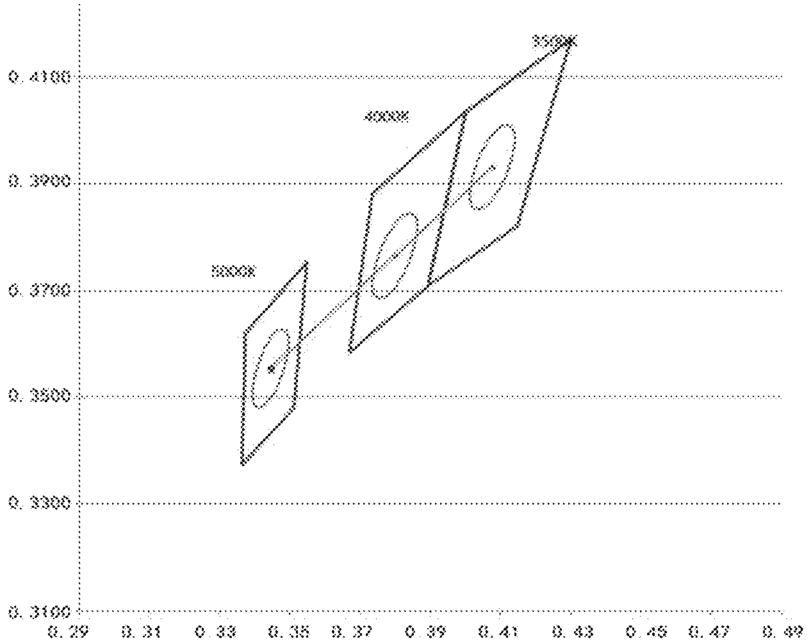
FIG. 10 illustrates another mixed color temperature diagram.
Figure 11:
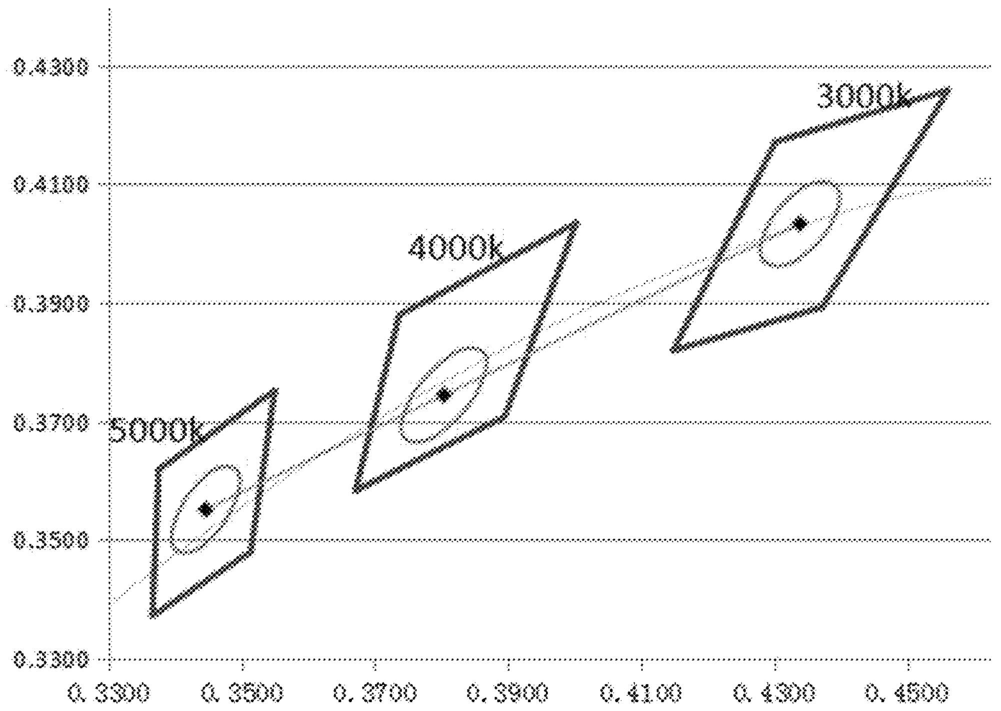
FIG. 11 illustrates another mixed color temperature diagram.
Figure 12:
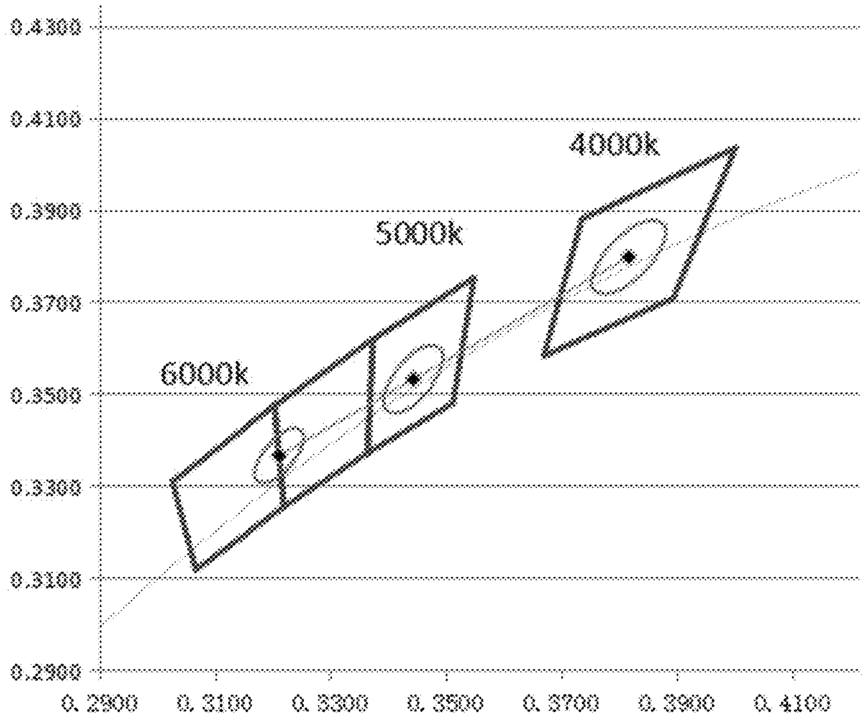
FIG. 12 illustrates another mixed color temperature diagram.
Figure 13:
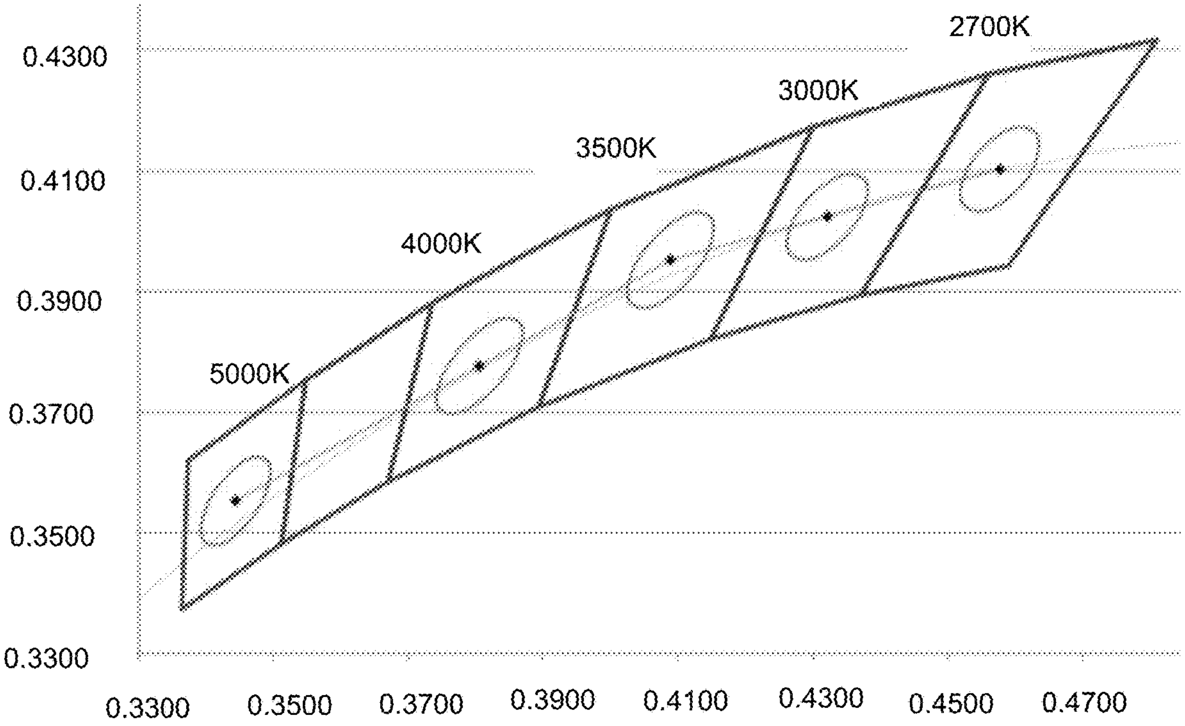
FIG. 13 illustrates another mixed color temperature diagram.

FIG. 5 and FIG. 14 show arrangement of different types of LED modules on a circuit board to integrate as a module.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:

a first light source having multiple first LED modules;

a second light source having multiple second LED modules; and a driver for control the first light source and the second light source to generate an output light of a required mixed color temperature, wherein the driver selects a first subset of the multiple first LED modules and a second subset of the multiple second LED modules to generate a first output light with a first color temperature, wherein the driver selects a third subset of the multiple first LED modules and a fourth subset of the multiple second LED modules to generate a second output light with a second color temperature, wherein the first light source has a color temperature between 2700K to 7000K, wherein the second light source has a color temperature between 1800K to 5500K, wherein a target color temperature mixed by the first light source and the second light source is between 2580K to 6020K.

2. The lighting apparatus of claim 1, wherein a portion of the multiple first LED modules and a portion of multiple second LED modules are not turned on for generating a third output light with a third color temperature.

3. The lighting apparatus of claim 2, wherein the driver determines a first activation number of the first LED modules and a second activation number of the second LED modules to mix a target color temperature.

4. The lighting apparatus of claim 3, wherein the first activation number and the second activation number are determined according a mixing formula approaching to a blackbody chromaticity diagram.

5. The lighting apparatus of claim 4, wherein a color tolerance adjustment of a mixed color temperature is less than 7 steps.

6. The lighting apparatus of claim 5, wherein the color tolerance adjustment of a mixed color temperature is less than 5 steps.

7. The lighting apparatus of claim 1, wherein the first LED module comprises multiple first LED chips connected in series as multiple first LED strings, wherein the second LED module comprises multiple second LED chips connected in series as multiple second LED strings.

8. The lighting apparatus of claim 7, wherein the first subset of the multiple first LED modules corresponds to a number of first LED strings, wherein the second subset of the multiple second LED modules corresponds to a number of second LED strings.

9. The lighting apparatus of claim 7, wherein the first LED series and the second LED series include same number of LED chips.

10. The lighting apparatus of claim 1, wherein the driver comprises a manual switch for a user to select from multiple options, wherein a first option corresponds to the first subset and the second subset, wherein a second option corresponds to the third subset and the fourth subset.

11. The lighting apparatus of claim 10, wherein manual switch is a mechanical switch for the user to operate.

12. The lighting apparatus of claim 11, wherein when the first option is selected, the first subset of multiple first LED modules are activated and other first LED modules of the first light source is not activated.

13. The lighting apparatus of claim 1, further comprising a third light source comprising multiple third LED modules, wherein the driver selects a variation number of the multiple third LED modules together with the first light source and the second light source to generate a target color temperature.

14. The lighting apparatus of claim 1, wherein a first element quantity of the first subset is smaller than a third element quantity of the third subset, wherein a second element quantity of the second subset is smaller than a fourth element quantity of the fourth subset.

15. The lighting apparatus of claim 14, wherein a first input voltage is supplied to the multiple first LED modules, wherein a second input voltage is supplied to the multiple second LED modules, wherein a difference between the first input voltage and the second input voltage is less than 10%.

16. The lighting apparatus of claim 1, wherein the multiple first LED modules and the multiple second LED modules are arranged on a circuit board in an alternative order.

17. The lighting apparatus of claim 16, wherein the first light source and the second light source are integrated on a single circuit board to form a light module.

18. The lighting apparatus of claim 17, wherein the first light source and the second light source are arranged with other light sources in a symmetric manner.

19. The lighting apparatus of claim 1, wherein the first light source, the second light source and the driver are integrated on a single circuit board.

20. The lighting apparatus of claim 19, wherein a manual switch is mounted on the single circuit board for a user to select a target color temperature.

* * * * *